United States Patent
Anand et al.

(10) Patent No.: US 7,733,854 B2
(45) Date of Patent: Jun. 8, 2010

(54) FORCED BUBBLE INSERTION SCHEME

(75) Inventors: Anupam Anand, Newark, CA (US);
Chien-Hsien Wu, Cuppertino, CA (US);
Samir K. Sanghani, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1209 days.

(21) Appl. No.: 11/090,110

(22) Filed: Mar. 28, 2005

(65) Prior Publication Data

US 2006/0114905 A1 Jun. 1, 2006

Related U.S. Application Data

(60) Provisional application No. 60/631,582, filed on Nov. 30, 2004.

(51) Int. Cl.
*H04L 12/50* (2006.01)
*H04L 12/28* (2006.01)
*H04L 12/43* (2006.01)
*G06F 12/00* (2006.01)

(52) U.S. Cl. .............. 370/376; 370/395.4; 370/458; 711/123; 711/125

(58) Field of Classification Search .......... 370/326, 370/336, 376, 392, 395.4, 423, 458, 459, 370/468, 395.31, 330, 345, 431, 442, 443; 711/123, 125
See application file for complete search history.

(56) References Cited

U.S. PATENT DOCUMENTS

| 6,144,668 | A  | * | 11/2000 | Bass et al. .......... 370/401 |
| 6,425,063 | B1 | * | 7/2002  | Mattson et al. ....... 711/167 |
| 7,352,748 | B1 | * | 4/2008  | Rozario et al. ....... 370/392 |
| 2002/0093973 | A1 | * | 7/2002  | Tzeng ............. 370/419 |
| 2002/0186705 | A1 | * | 12/2002 | Kadambi et al. ....... 370/452 |
| 2004/0037309 | A1 | * | 2/2004  | Hauck et al. ......... 370/462 |
| 2006/0256756 | A1 | * | 11/2006 | Wakabayashi ......... 370/335 |

OTHER PUBLICATIONS

David Robinson, Patrick Lysaght, Gordon McGregor and Hugh Dick, Performance Evaluation of a Full Speed PCI Initiator and Target Subsystem Using FPGAs, 1997, Springer Berlin/Heidelberg, Lecture Notes in Computer Science vol. 1304/1997, p. 42.*

* cited by examiner

*Primary Examiner*—Chirag G Shah
*Assistant Examiner*—Ashley L Shivers

(57) ABSTRACT

A network device for processing packets. The network device includes a memory management unit for storing packets and performing resource checks on each packet and an egress module for performing packet modification and transmitting the packet to a destination port. The memory management unit includes a timer for indicating that a free space should be created on a bus slot between the memory management unit and the egress module, wherein the free space is used for transmitting CPU instructions from the memory management unit to the egress module.

18 Claims, 4 Drawing Sheets

FORCED BUBBLE INSERTION SCHEME

This application claims priority of U.S. Provisional Patent Application Ser. No. 60/631,582, filed on Nov. 30, 2004. The subject matter of the earlier filed application is hereby incorporated by reference.

BACKGROUND OF THE INVENTION

1. Field of the Invention

The present invention relates to a network device in a packet switched network and more particularly to a method for scheduling CPU instructions in the network device.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As packets enter the device from multiple ports, they are forwarded to the ingress module where switching and other processing are performed on the packets. Thereafter, the packets are transmitted to one or more destination ports through the MMU and the egress module. According to a current switching system architecture, the MMU inserts request/instructions from a CPU to the egress module between empty slot/bubble on a bus from the MMU to the egress module. The bubbles on the bus are typically found between packets. However, if all ports on the network are transmitting packet, the MMU may not be able to obtain a bubble on which to transmit a CPU instruction. Therefore a scheme is needed wherein the MMU is ensured of empty slots for transmitting CPU instructions.

SUMMARY OF THE INVENTION

According to one aspect of the invention, there is provided a network device for processing packets. The network device includes a memory management unit for storing packets and performing resource checks on each packet and an egress module for performing packet modification and transmitting the packet to a destination port. The memory management unit includes a timer for indicating that a free space should be created on a bus slot between the memory management unit and the egress module, wherein the free space is used for transmitting CPU instructions from the memory management unit to the egress module.

According to another aspect of the invention, there is provided a method for processing packets in a network device. The method includes the step of initializing a timer in a memory management unit. The method also includes the steps of creating a free space on a bus slot between the memory management unit and an egress module when the timer expires and using the free space to transmit CPU instructions from the memory management unit to the egress module.

According to another aspect of the invention, there is provided an apparatus for processing packets in a network device. The apparatus includes initializing means for initializing a timer in a memory management unit. The apparatus also includes creating means for creating a free space on a bus slot between the memory management unit and an egress module when the timer expires. The apparatus further includes using means for using the free space to transmit CPU instructions from the memory management unit to the egress module.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
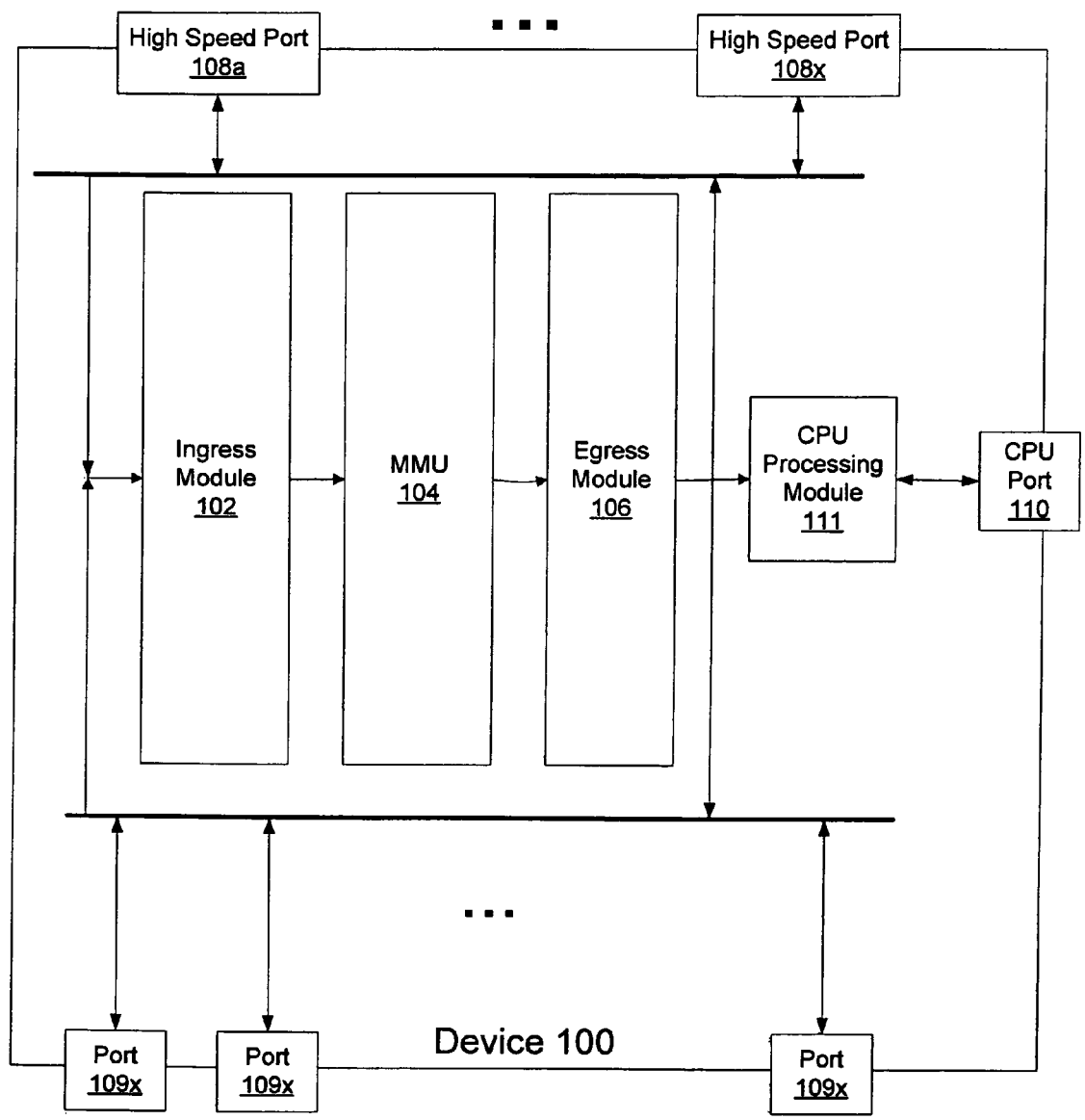
FIG. 1 illustrates a network device in which an embodiment of the present invention may be implemented.

FIG. 1 illustrates a network device, such as a switching chip, in which an embodiment of the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module. Device 100 implements a pipelined approach to process incoming packets. The key to the performance of device 100 is the ability of the pipeline to process one packet every clock. According to an embodiment of the invention, device 100 includes a 133.33 MHz core clock. This means that the device 100 architecture is capable of processing 133.33M packet/sec.

Device 100 may also include one or more internal fabric high speed ports, for example a HiGig port 108a-108x, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports 109j-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109j-109x on device 100 may be physical external Ethernet ports or trunk ports. If a destination port is a trunk port, device 100 dynamically selects a physical external Ethernet port in the trunk by using a hash to select a member port. The dynamic selection enables device 100 to allow for dynamic load sharing between ports in a trunk.

Figure 2:
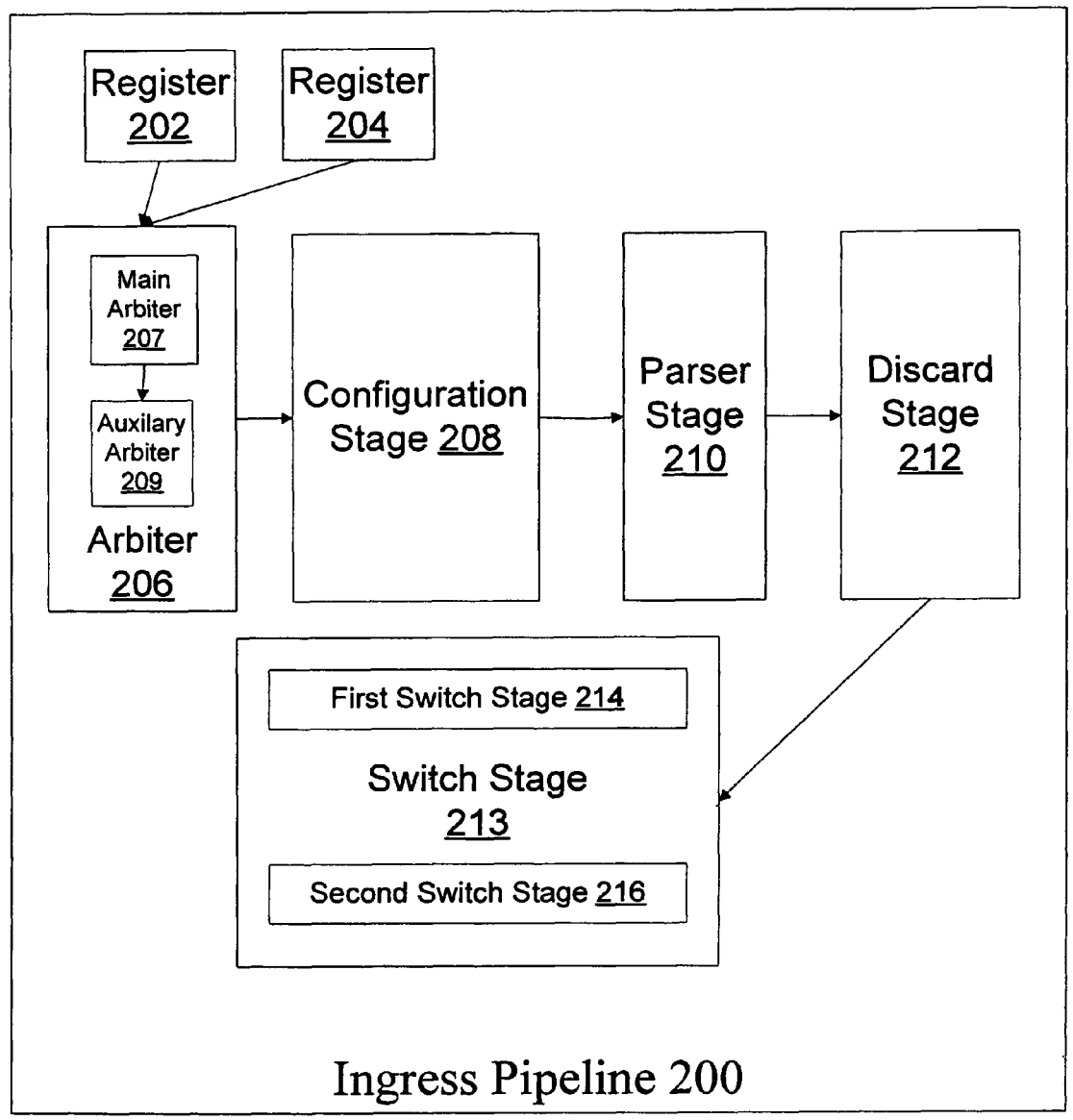
FIG. 2 illustrates a centralized ingress pipeline architecture.

FIG. 2 illustrates an embodiment of the centralized ingress pipeline 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from port 109a-019i or CPU processing module 111 and stores cell data in data holding register 202. Arbiter 206 is responsible for scheduling requests from ports 109a-109i or CPU processing module 111. Arbiter 206 includes a main arbiter 207 for scheduling requests from ports 108 and 109 and an auxiliary arbiter 209 for scheduling requests from port 111. Configuration stage 208 is used for setting up a table with all major port-specific fields that are required for switching. Parser stage 210 parses the incoming packet and a high speed module header, if present. Discard stage 212 looks for various early discard conditions and either drops the packet and/or prevents it from being sent through pipeline 200. Switching stage 213 performs all switch processing in ingress pipeline 200, including address resolution.

Once a packet enters device 100 on a source port 109a-109i, the packet is transmitted to ingress module 102 for processing. Upon processing the packet, MMU 104 transmits the packet to the egress module 106 for possible modification. MMU 104 passes packets to egress module 106 for all ports, including port 110, on a 1024 bit bus to a transmit pipeline. Thereafter, packets from all of ports 109 and 108 are accommodated on a 72 cycle slot. Since the MACs associated with ports 108 and 109 typically transmits packets at a lower rate than the processing speed of MMU 104, there are typically "natural" bubbles/free space between packets, wherein MMU 104 transmits CPU instructions on the bubble on the bit bus from MMU 104 to the transmit pipeline. Nevertheless, there exist a situation in which all of port 108 and 109 may transmit 129 byte packets, such that MMU 104 may not be able to obtain a bubble on which to insert CPU instructions. This will in effect block all processing between the CPU and network device 100.

According to one embodiment of the invention, MMU 104 includes a programmable timer, wherein when the timer expires, MMU 104 forces a bubble in the 1024 bit bus and inserts a pending instruction from CPU processing module 111 on that bubble. MMU 104 then resets the timer. In one embodiment of the invention, MMU 104 may only create a bubble between packets. For example, if MMU 104 is transmitting a large packet from port 108a, when the timer expires, MMU 104 must wait from the End Cell of the Packet (EOP) before inserting a bubble on a slot associated with port 108a. Another embodiment of the invention requires a correlation between cell requests pending from CPU processing module 111 in MMU 104 and bubbles created by MMU 104, wherein if the timer expires and there is no pending data from CPU processing module 111 in MMU 104, MMU 104 may not create a bubble on the bit bus. Furthermore, another embodiment of the invention provides that MMU 104 must reset the timer every time MMU 104 obtains a "natural bubble", i.e., a bubble that is not created by MMU 104.

Figure 3:
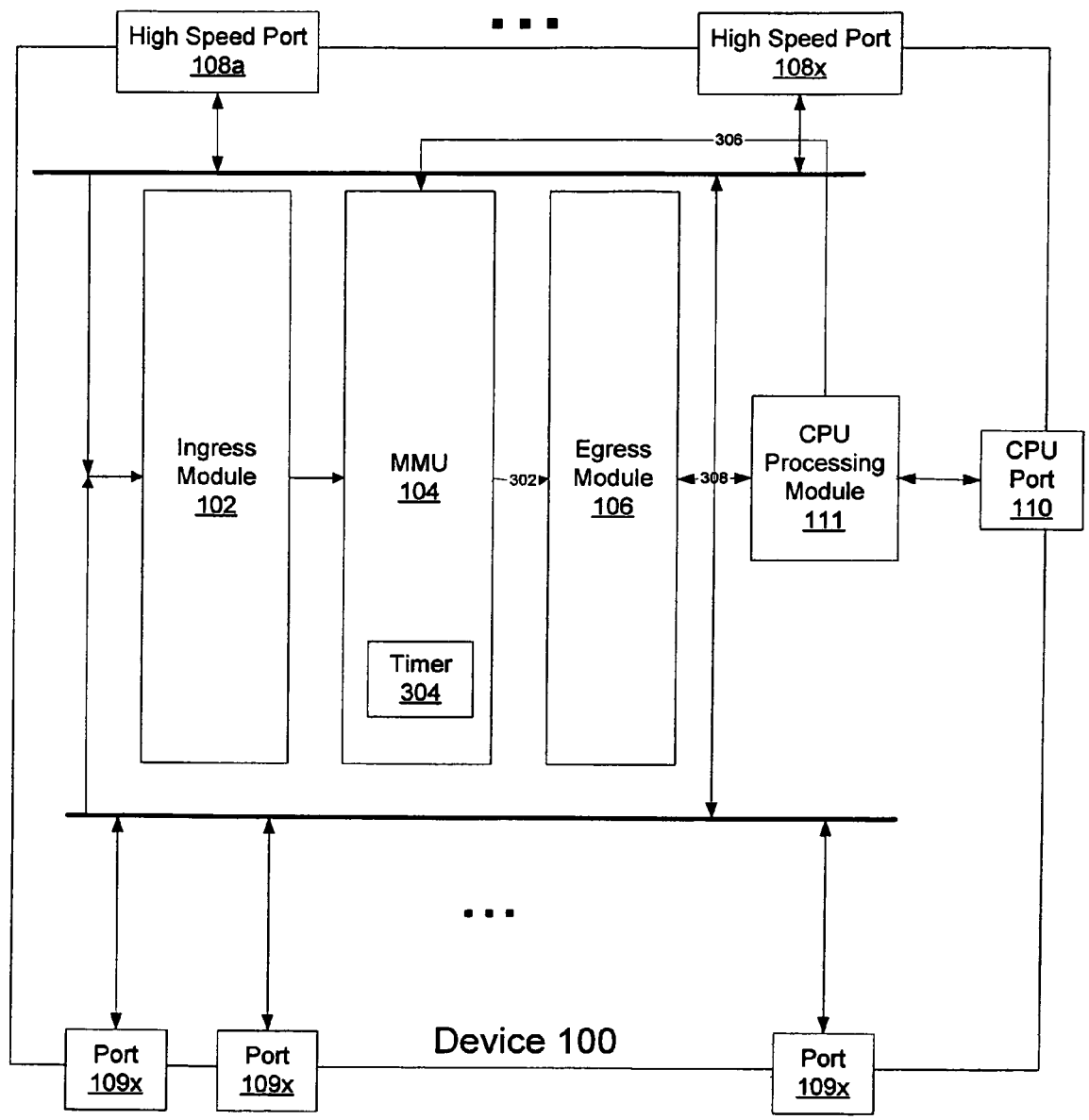
FIG. 3 illustrates the connection between the MMU and the egress module.

FIG. 3 illustrates a connection between MMU 104 and egress module 106. Upon receiving the packet from MMU 104, egress module 106 supports multiple egress functions for a 72 gigabyte port bandwidth and a CPU processing bandwidth. According to an embodiment, egress module 106 is capable of handling more than 72 gigabytes of traffic, i.e., 24 one GE port, 4 high speed ports (12G) and a CPU processing port of 0.2GE. Egress module 106 receives original packets, as input from Ethernet ports 109a-109i, from MMU 104, and may either transmit modified or unmodified packets to destination ports 109j-109x. According to one embodiment of the invention, all packet modifications within device 100 are made in egress module 106 and the core processing of egress module 106 is capable of running faster than the processing of destination ports 109j-109x. Therefore, egress module 106 provides a stall mechanism on a port basis to prevent ports 109j-109x from becoming overloaded and thus services each port based on the speed of the port.

In an embodiment of the invention, egress module 106 is connected to MMU 104 by a 1024 bits data interface 302 and all packets transmitted from MMU 104 passes through egress module 106. Specifically, MMU 104 passes unmodified packet data and control information to egress module 106 on data interface 302. The control information includes the results of table lookups and switching decisions made in ingress module 102. The data bus 302 from MMU 106 is shared across all ports 108 and 109 and the CPU processing 111. As such, bus 302 uses a "request based" TDM scheme, wherein each Gig port has a turn on the bus every 72 cycles and each high speed Port 108 has a turn every 6 cycles. CPU processing packet data is transmitted over bubbles—free spaces occurring on bus 302. As noted above, MMU 104 also includes a timer 304 for creating bubbles on bus 302 when MMU 104 receives an instruction from CPU processing module 111 on bus 306. Upon receiving the information from MMU 104, egress module 106 parses the packet data, performs table lookups, executes switch logic, modifies, aligns and further buffers the packet before the data is transmitted to the appropriate destination port 109i-109j.

Egress module 106 is connected to CPU processing module 111 through a 32 bit S-bus interface 308 which the CPU uses to send requests to egress module 106. The requests are typically for reading the egress module's resources, i.e., registers, memories and/or stat counters. Upon receiving a request, egress module 106 converts the request into a command and uses a mechanism, described in detail below, for storing and inserting CPU instructions into a pipeline wherever there is an available slot on the pipeline.

Figure 4:
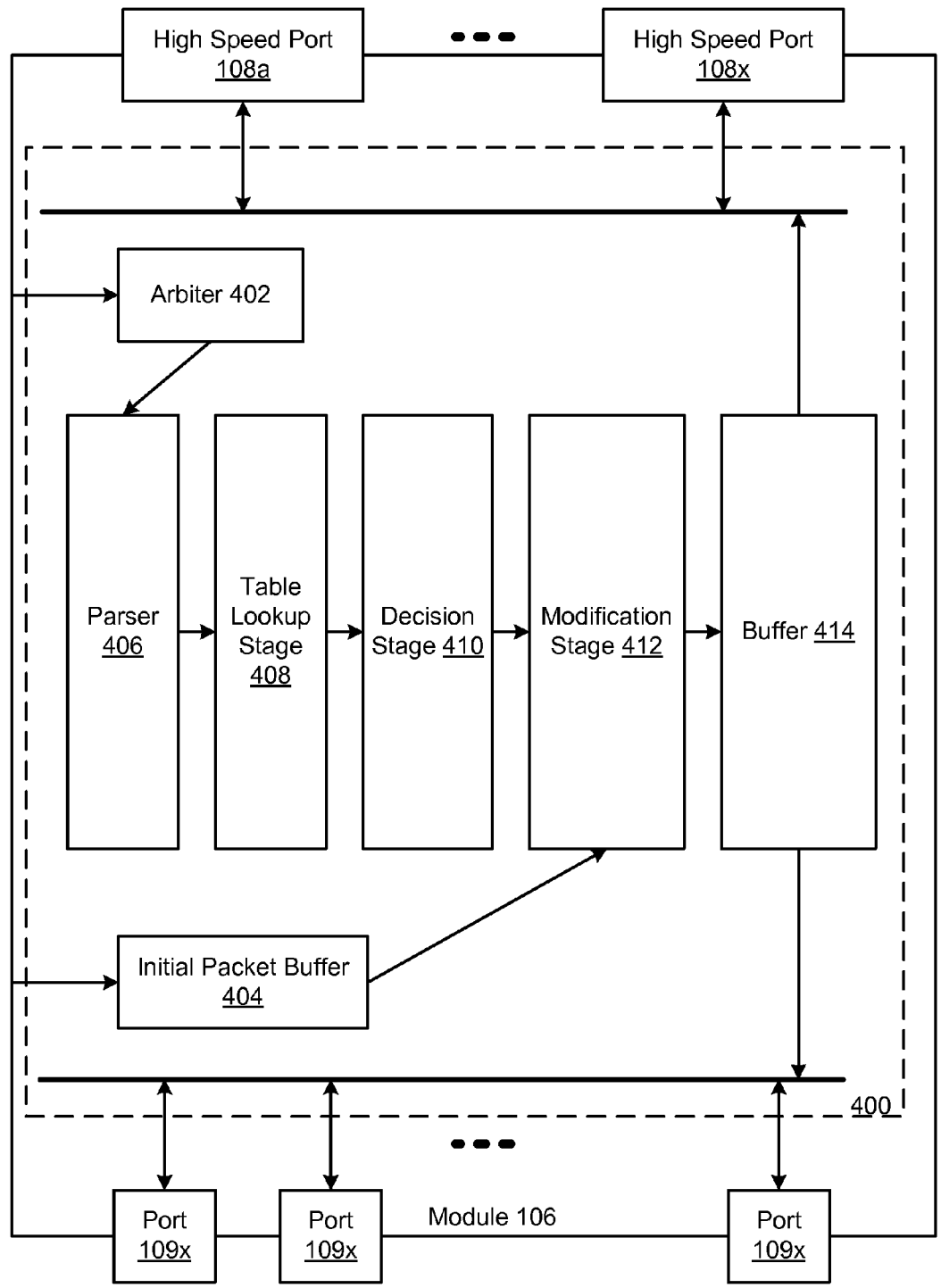
FIG. 4 illustrates a centralized egress pipeline architecture of an egress stage.

FIG. 4 illustrates a centralized egress pipeline architecture 400 of egress stage 106. Egress pipeline 400 includes an arbiter 402, parser 406, a table lookup stage 408, a decision stage 410, a modification stage 412 and a data buffer 414. Arbiter 402 provides arbitration for accessing egress pipeline 400 resources between packet data and control information from MMU and information from the CPU. Parser 406 performs packet parsing for table lookups and modifications. Table lookup stage 408 performs table lookups for information transmitted from parser 406. Decision stage 410 is used for deciding whether to modify, drop or otherwise process the packet.

All incoming packet data from MMU 104 is transmitted to an initial packet buffer 404. In an embodiment of the invention, the initial packet buffer is 1044 bits wide and 18 words deep. Egress pipeline 400 receives two inputs, packet data and control information from MMU 104 and CPU operations from the s-bus. Initial packet buffer 404 stores packet data and keeps track of any empty cycles coming from MMU 104. Initial packet buffer 404 outputs its write address and parser 406 passes the latest write address with pipeline instructions to modification stage 412.

Arbiter 402 collects packet data and control information from MMU 104 and read/write requests to registers and memories from the CPU and synchronizes the packet data and control information from MMU 104 and writes the requests from the CPU in a holding register. Based on the request type from the CPU, arbiter 402 generates pipeline register and memory access instructions and hardware table initialization instructions. After arbiter 402 collects packet data, CPU requests and hardware table initialization messages, it generates an appropriate instruction.

After receiving an instruction from arbiter 402, parser 406 parses packet data associated with the Start Cell of Packet instruction and the Start-End Cell of Packet instruction using the control information and a configuration register transmitted from arbiter 402. According to an embodiment, the packet data is parsed to obtained L4 and L3 fields which appear in the first 148 bytes of the packet.

Table lookup stage 408 then receives all packet fields and register values from parser 406. Information from table lookup stage 408 is then transmitted to decision stage 410 where a decision is made as to whether to modify, drop or otherwise process the packet. For example, decision stage 410 first looks for flush bits at the beginning of the packet transmission and if the flush bits are set, the packets are marked "dropped". In an embodiment of the invention, if a flush bit for a packet is set for a packet already in transmission, the packet is completely transmitted and the next packet is flushed. In another example, MMU 104 may mark packets as Purge, Aged or Cell Error and decision stage 410 may either drop or transmit these packets but mark them as erroneous. In another example, if a VLAN translate feature is enabled, but there was a miss in a CAM lookup, the decision stage 410 may drop the packet if certain fields are set. Decision stage 410 also determines if the packet needs to be L4 switched or L3 routed and the type of mirroring functions that need to be performed on the packet.

Modification stage 412 thereafter constructs a Tunnel IP Header and a module header for the packet, makes replacement changes in the packet and computes IP checksum for outer and inner IP headers. Modification stage 412 receives a packet data interface from the initial buffer 404 which enables modification stage 412 to provide a read address to initial buffer 404 and in response obtain the packet data and basic control data. Modification stage 412 then generates Middle of Packet and End of Packet instructions based on the data received from initial buffer 404 and makes changes based on these commands. Modification stage 412 also receives all packet decisions and pipeline commands from decision stage 410 and uses this information to make further changes to the packet. Specifically, all fields of the tunnel IP header which need to be filled by incoming packet fields are filled. Furthermore, IP checksum for tunnel IP header is computed in parallel with the header construction. Modification stage 412 further reads back packets and control information from initial buffer 404 and performs all packet modifications and replacements of fields. It outputs CPU operations and hardware commands and data and addresses associated with them on one bus and outputs packet data and control information on another bus. Additionally, modification stage 412 performs physical encapsulation and de-capsulation of headers and tag removal and insertions. If a packet is going to a high speed port, modification stage 412 converts the packet from Ethernet format to high speed format. Modification stage 412 also aligns the packet by padding packets smaller than 64 bytes and removes holes by aligning data to 1314 bit boundary. Thereafter, 1314 bits "complete" data word is output from modification stage 412 to the data buffer 414.

Data buffer 414 stores completed data words from modification stage 412 in memory. Before the egress pipeline sends packets out to destination ports 109j-109x, the packet data are stored in the data buffer 414 for pipeline latency and port speed matching. Data buffer 414 is capable of requesting data from MMU 104 whenever it has a free space.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for processing packets, the network device comprising:
   a memory management unit configured to store packets and perform resource checks on each packet the memory management unit including a timer; and
   an egress module configured to perform packet modifications and transmit the packet to a destination port, and wherein the memory management unit is configured to:
   detect an expiration of the timer;
   create a non-natural free space or empty slot on a bus between the memory management unit and the egress module when the timer expires and after an end of cell of a packet; and
   transmit a CPU instruction from the memory management unit to the egress module on the created free space or empty slot on the bus.

2. The network device according to claim 1, wherein the memory management unit is configured to create the free space between packets when the timer expires and the memory management unit insert a pending CPU instruction in the created free space.

3. The network device according to claim 1, wherein the memory management unit is configured to reset the timer after the memory management unit inserts a pending CPU instruction in the free space.

4. The network device according to claim 1, wherein the memory management unit is configured to create a free space only if there is a pending CPU instruction in the memory management unit.

5. The network device according to claim 1, wherein the memory management unit is configured to reset the timer when the memory management unit uses a non-natural free space or a free space that was not created by the memory management unit.

6. The network device according to claim 1, wherein the memory management unit is connected to a CPU processing module via a second bus, wherein the memory management module is configured to accept CPU instructions from the CPU processing module on the second bus.

7. The network device according to claim 1, wherein the second bus comprises a 32-bit bus.

8. The network device according to claim 1, wherein the bus from the memory management unit to the egress module is configured as a request based time division multiplexing bus.

9. The network device according to claim 1, wherein the bus from the memory management unit to the egress module is configured to transmit packets from a high speed port once every six cycles and to transmit packets from a gigabyte port once every 72 cycles.

10. A method for processing packets on a network device, the method comprising the steps of:
   initializing a timer in a memory management unit;
   creating a non-natural free space or empty slot on a bus between the memory management unit and an egress module when the timer expires and after an end of cell of packet; and
   transmitting one or more CPU instructions from the memory management unit to the egress module using the created free space.

11. The method according to claim 10, further comprising creating the free space between packets on the bus when the timer expires and inserting a pending CPU instruction in the created free space.

12. The method according to claim 10, further comprising resetting the timer after the memory management unit inserts a pending CPU instruction in the free space.

13. The method according to claim 10, further comprising creating the free space if there is a pending CPU instruction in the memory management unit.

14. The method according to claim 10, further comprising resetting the timer every time the memory management unit uses a free space that was not created by the memory management unit.

15. The method according to claim 10, further comprising accepting CPU instructions from the CPU processing module on a second bus.

16. The method according to claim 10, further comprising configuring the bus from the memory management unit to the egress module as a request-based time division multiplexing bus.

17. The method according to claim 10, further comprising configuring the bus from the memory management unit to the egress module to transmit packets from a high speed port once every six cycles to transmit packets from a gigabyte port once every 72 cycles.

18. An apparatus for processing packets in a network device, the apparatus comprising a memory management unit, the apparatus configured to:
   initialize a timer in a memory management unit;
   create a non-natural free space or empty slot on a bus between the memory management unit and an egress module when the timer expires and after an end of cell of packet; and
   transmit one or more CPU instructions from the memory management unit to the egress module using the created free space.

* * * * *